United States Patent [19]
Tsukagoshi et al.

[11] Patent Number: 4,696,335
[45] Date of Patent: Sep. 29, 1987

[54] PNEUMATIC RADIAL TIRE

[75] Inventors: Tetsuhito Tsukagoshi, Kodaira; Tamotsu Matsunuma, Urawa; Shigeo Makino, Tokorozawa, all of Japan

[73] Assignee: Bridgestone Corporation, Tokyo, Japan

[21] Appl. No.: 760,876

[22] Filed: Jul. 31, 1985

[30] Foreign Application Priority Data

Aug. 7, 1984 [JP] Japan .................................. 59-165435

[51] Int. Cl.$^4$ ........................... B60C 9/18; B60C 9/28
[52] U.S. Cl. .................................... 152/535; 152/526; 152/538
[58] Field of Search ............... 152/454, 526, 535, 538, 152/560, 532, 527, 212; 57/902, 237; 428/295

[56] References Cited

U.S. PATENT DOCUMENTS

| 2,958,359 | 2/1958 | Boussu et al. | 152/535 X |
| 3,195,604 | 7/1965 | Boussu et al. | 152/535 |
| 3,224,481 | 12/1965 | Lugli | 152/535 X |
| 3,243,338 | 3/1966 | Jackson | 428/295 X |
| 3,677,319 | 7/1972 | Mirtain | 152/527 |
| 3,789,898 | 2/1974 | Montagne | 152/535 |
| 3,842,884 | 10/1974 | Bertrand | 152/527 |
| 4,262,726 | 4/1981 | Welter | 152/535 X |

FOREIGN PATENT DOCUMENTS

| 1309356 | 10/1962 | France | 152/526 |
| 1435804 | 10/1964 | France | 152/535 |
| 2017019 | 9/1979 | United Kingdom | 152/531 |

Primary Examiner—Donald E. Czaja
Assistant Examiner—Ramon R. Hoch
Attorney, Agent, or Firm—Cushman, Darby & Cushman

[57] ABSTRACT

A pneumatic radial tire comprising a belt portion disposed between the tread portion and the carcass portion wherein the belt portion is constituted by at least a pair of first belts, a second belt and a third belt which are arranged from radially inward to outward, the first, second and third belts having a first series, second series and third series of parallel cords embedded therein, respectively. The first belts being laterally spaced apart a predetermined lateral space symmetrically with respect to the mid-circumferential centerline and the cords thereof are disposed at an angle of between 40 to 60 degrees with respect to the mid-circumferential centerline. The spaced-apart first belts have opposite lateral ends which are located within less than 5 percent of a belt width of the third belt from the corresponding opposite lateral ends of the third belt, respectively. The first series of the cords of the first belt and the second series of the cords of the second belt are oriented in same directions, while the second series of the cords of the second belt and the third series of the cords of the third belt are oriented in opposite directions with each other.

8 Claims, 10 Drawing Figures

PNEUMATIC RADIAL TIRE

FIELD OF THE INVENTION

The present invention relates to pneumatic radial tires and more particularly to the belt structure of a pneumatic radial tire used in trucks, buses and like vehicles.

SUMMARY OF THE INVENTION

In accordance with one important aspect of the present invention, there is provided a pneumatic radial tire comprising a belt portion disposed between the tread portion and the carcass portion wherein the belt portion is constituted by at least a pair of first belts, a second belt and a third belt which are arranged from radially inward to outward, the first, second and third belts having a first series, second series and third series of parallel cords embedded therein, respectively. The first belts being laterally spaced apart a predetermined lateral space symmetrically with respect to the mid-circumferential centerline and the cords thereof are disposed at an angle of between 40 to 60 degrees with respect to the mid-circumferential centerline. The spaced-apart first belts have opposite lateral ends which are located within less than 5 percent of a belt width of the third belt from the corresponding opposite lateral ends of the third belt, respectively. The first series of the cords of the first belt and the second series of the cords of the second belt are oriented in same directions, while the second series of the cords of the second belt and the third series of the cords of the third belt are oriented in opposite directions with each other.

In accordance with another important aspect of the present invention, there is provided a pneumatic radial tire comprising a tread portion extending circumferentially thereabout and having a mid-circumferential centerline contained in a plane which is substantially perpendicular to the rotational axis of the tire, a pair of side portions, a pair of bead portions, a carcass portion having at least a carcass ply, and a belt portion disposed between the tread portion and the carcass portion; the belt portion being constituted by at least a pair of first belts, a second belt through a (n−1)th and a nth belt which are arranged from radially inward to outward, the n being a natural number not less than 4; the first belt, second belt through the (n−1)th belt and the nth belt having a first series of parallel cords, a second series of parallel cords through a (n−1)th series of parallel cords and a nth series of parallel cords embedded therein, respectively; the second belt through (n−1)th belt and nth having belt widths $W_2$ through $W_{n-1}$ and $W_n$, respectively, which are reduced from the second belt to the kth belt; a (k−1)th belt and the lateral end of a kth belt being spaced apart a distance $D_{k-1*k}$ defined by an equation $D_{k-1*k}/D_{k-2*k-1} = \beta(W_k/W_{k-1})$ wherein the k is a number arbitrarily selected from 4 to n, the $W_k$ is a width of the kth belt, and the $\beta$ is between 0.3 and 1.0; the first belts being laterally spaced apart a predetermined lateral space symmetrically with respect to the mid-circumferential centerline and the cords thereof being disposed at an angle of between 40 to 60 degrees with respect to the mid-circumferential centerline; the spaced-apart first belts having opposite lateral ends which are located within less than 5 percent of the belt width $W_3$ of the third belt from the corresponding opposite lateral ends of the third belt, respectively; the first series of the cords of the first belt and the second series of the cords of the second belt being oriented in same directions; and two adjacent sets of the cords of two adjacent belts of between the second and kth belts being oriented in opposite directions with each other.

In accordance with still another important aspect of the present invention, there is provided a pneumatic radial tire comprising a tread portion extending circumferentially thereabout and having a mid-circumferential centerline contained in a plane which is substantially perpendicular to the rotational axis of the tire, a pair of side portions, a pair of bead portions, a carcass portion having at least a carcass ply, and a belt portion disposed between the tread portion and the carcass portion; the belt portion being constituted by at least a pair of first belts, a second belt through a (n−1)th and a nth belt which are arranged from radially inward to outward, the n being a natural number not less than 4, and an auxiliary belt disposed between two adjacent belts of between the second and nth belts and laterally inwardly of the belt overlying the auxiliary belt; the first belt, second belt through a (k−1)th belt and a kth belt having a first series of parallel cords, a second series of parallel cords through a (k−1)th series of parallel cords and a kth series of parallel cords embedded therein, respectively, the k being a number arbitrarily selected from 4 to n; the second belt through (k−1)th belt and kth having belt widths $W_2$ through $W_{k-1}$ and $W_k$, respectively, which are reduced from the second belt to the kth belt; the auxiliary belt having a width $W_a$ which is less than the width of the belt overlying the auxiliary belt, and having a series of parallel cords embedded therein; the (k−1)th and the kth belt being radially spaced apart a radial distance $D_{k-1*k}$ defined by an equation $D_{k-1*k}/D_{k-2*k-1} = \beta(W_k/W_{k-1})$ wherein the $W_k$ is a width of the kth belt and the $\beta$ is between 0.3 and 1.0; the first belts being laterally spaced apart a predetermined lateral space symmetrically with respect to the mid-circumferential centerline and the cords thereof being disposed at an angle of between 40 to 60 degrees with respect to the mid-circumferential centerline; the spaced-apart first belts having opposite lateral ends which are located within less than 5 percent of the belt width $W_3$ of the third belt from the corresponding opposite lateral ends of the third belt, respectively; the first series of the cords of the first belt and the second series of the cords of the second belt being oriented in same directions; and two adjacent sets of the cords of two adjacent belts of between the second and kth belts being oriented in opposite directions with each other.

DESCRIPTION OF THE PRIOR ART

In a radial tire travelling mostly on paved road and sometimes on non-paved road, the tire is easily damaged or cut in the tread portion thereof during rotation thereof by obstacles such as rocks, stones or the like scattered on the non-paved road and thus appearance of the tire is impaired. Moreover, the belts are easily separated from each other, particularly at the ends thereof. Accordingly, in order to improve the appearance, enhance the belt durability, the improvements of the tread portion of the tire have been made.

A conventional radial tire generally indicated by reference numeral 31 is illustrated in FIG. 1. The radial tire 31 comprises a tread portion 32 extending circumferentially thereabout, a pair of side portions 33 and 33', a pair of bead portions 34 and 34', a carcass portion 36 having at least a carcass ply 35, and a belt portion 37. The belt portion 37 is disposed between the tread portion 32 and the carcass portion 36 and has a width substantially equal to that of the tread portion 32. The belt portion 37 includes four reinforced cord belts or the like and is numbered a first belt, second belt, third belt and forth belt from radially inward to outward. The first belt is constituted by two belts which are laterally spaced apart symmetrically with respect to the mid-circumferential centerline of the tread portion 32 and the cords of the first belt are disposed at an angle of 60 to 90 degrees with respect to the mid-circumferential centerline of the tread portion 32. The cords of the second, third and fourth belts are disposed at an angle of approximately 15 degrees with respect to the mid-circumferential centerline.

When vehicles using the conventional radial tire 31 are travelling at high speed on paved road or coarse off-road and on curves in a paved road, a large force is repeatedly exerted in the direction of a rotational axis of the tire 31 on both the tread portion 32 and the belt portion 37. The tire 31 is also undesirably bent at the tread portion 32 and the belt portion 37 when strikes a rock or other hard object scattered on non-paved road. In the conventional tire 31, since the cords of the first belt of the belt portion 37 are disposed at an angle of 60 to 90 degrees with respect to the mid-circumferential centerline of the tread portion 32, the first belt of the belt portion 37 has high rigidity against the large force exerted in the direction of the rotational axis thereof. The high rigidity of the first belt of the belt portion 37 has reduced the durability of the conventional radial tire 31 when the large force in the direction of the rotational axis of the tire is repeated exerted on the belt portion or when the belt portion 37 is undesirably bent by the increase of loads to be acted on the vehicle portion 37. More particularly, the conventional radial tires have encountered a drawback that the belts are separated with each other, particularly at the ends of the second and third belts, or the ends of the belts are easily separated from the tread portion.

It is, accordingly, an important object of the present invention to provide an improved radial tire for trucks and buses which has high resistance to cut and high durability of belts on non-paved road and at the same time maintains good cruising performance and high durability of belts on paved road.

It is another important object of the present invention to provide an improved radial tire in which the belts of the belt portion are not separated even if the size of the tire become large or the loads to be acted on the radial tire become large.

It is still another important object of the present invention to provide an improved, large-sized radial tire in which the belt portion thereof has high resistance to fatigue and high resistance to impact force, and the tread portion thereof has high resistance to cut even when the tire is continuously used for a long period of time under very severe and highly loaded conditions on non-paved road.

BRIEF DESCRIPTION OF THE DRAWINGS

The drawbacks of a prior-art radial tire and the features and advantages of a radial tire constructed in accordance with the present invention will be more clearly understood from the following description taken in conjunction with the accompanying drawings in which.

DESCRIPTION OF THE PREFERRED EMBODIMENTS

Figure 1:
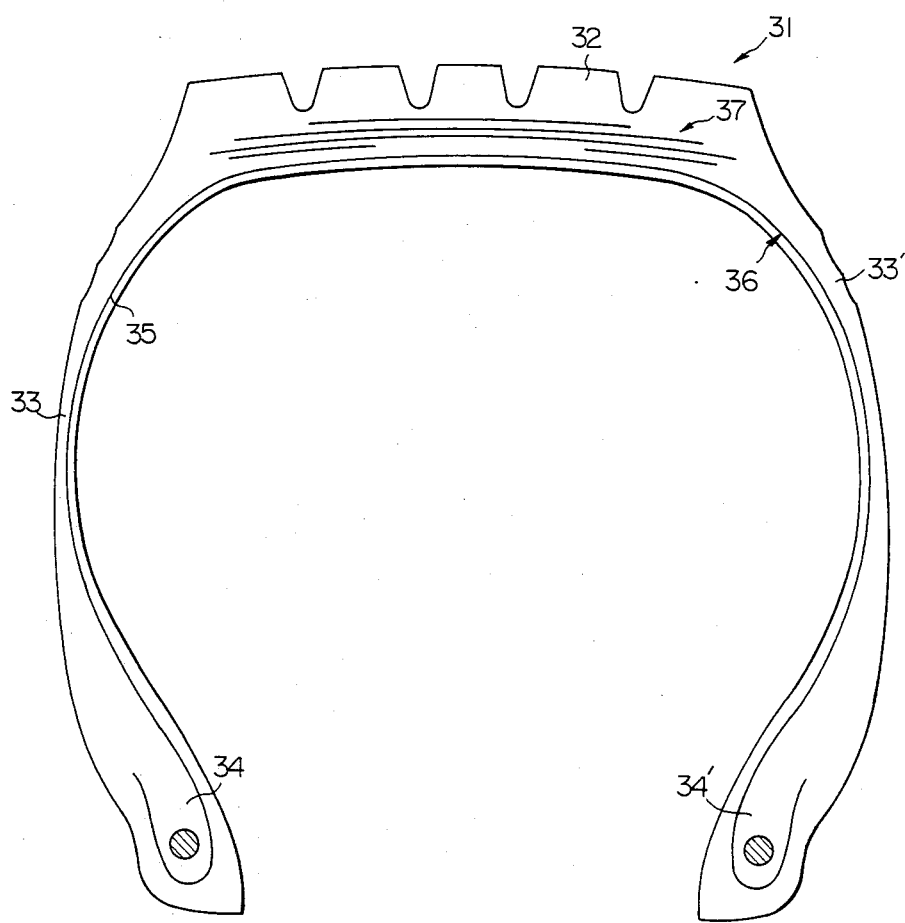
FIG. 1 is a cross sectional view of the prior-art radial tire.
Figure 2:
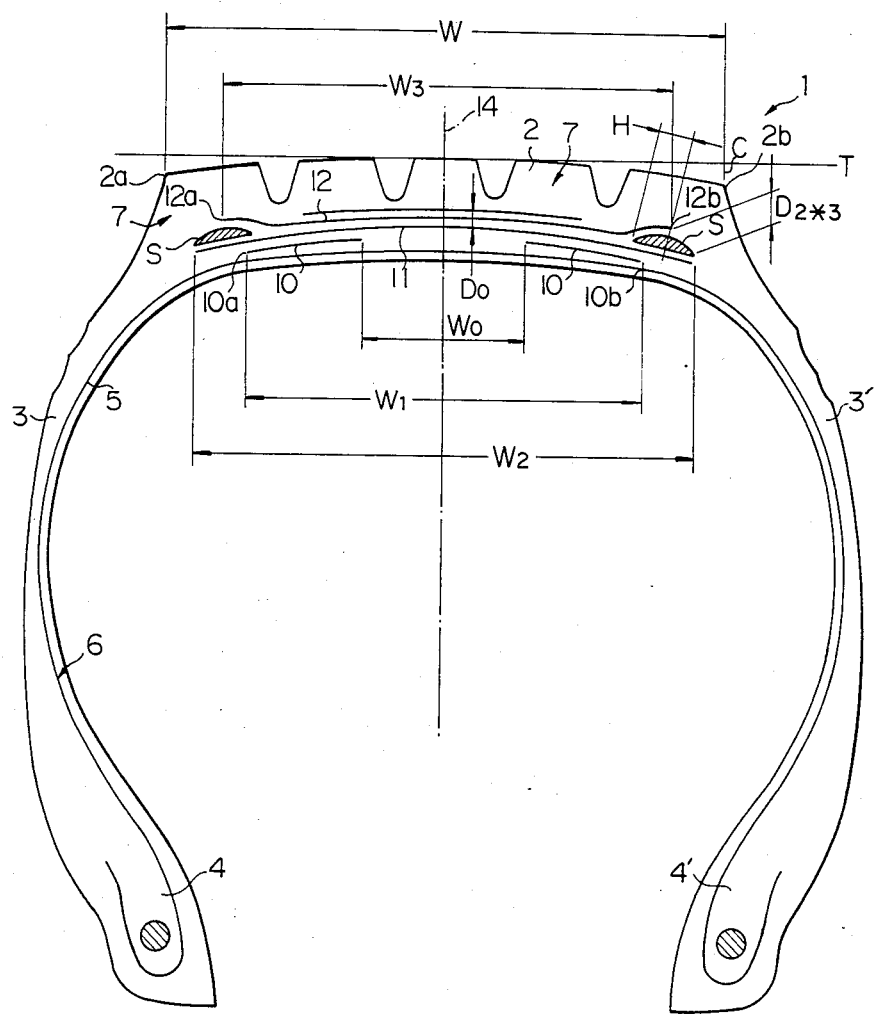
FIG. 2 is a cross sectional view of the radial tire of a first embodiment constructed in accordance with present invention in which the belt portion between the tread portion and the carcass portion thereof has embedded therein at least three belts and intervening rubber between a radially intermediate and outermost belts.
Figure 3:
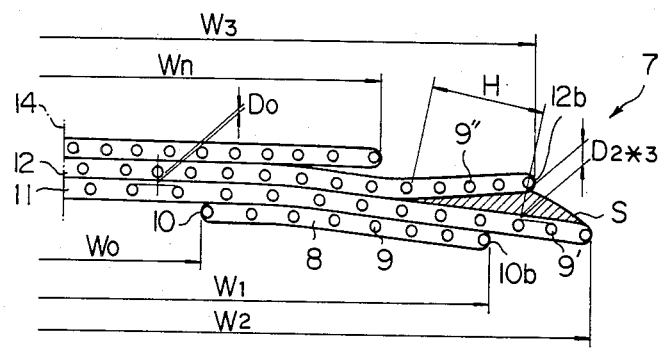
FIG. 3 is an enlarged view of the belts of the belt portion of the radial tire shown in FIG. 2.

Referring now in greater detail to the drawings and initially to FIG. 2, there is shown the first embodiment of a radial tire 1 for a truck, bus and the like, constructed in accordance with the present invention. In the first embodiment, it is noted that a belt portion between a tread portion and a carcass portion is constituted by at least three plies. The radial tire 1 shown in FIG. 2 comprises a tread portion 2 extending circumferentially thereabout, a pair of side portions 3 and 3', a pair of bead portions 4 and 4', a carcass portion 6 having at least a carcass ply 5, and a belt portion 7 disposed between the tread portion 2 and the carcass portion 6. As shown in FIGS. 2 and 3, the belt portion 7 is constituted by at least three plies 8, viz., a pair of first belts 10, a second belt 11 and a third belt 12 which are arranged from radially inward to outward. The first, second and third belts 10, 11 and 12 have a first series, second series and third series of parallel cords 9, 9' and 9" embedded therein, respectively. The first, second and third belts 10, 11 and 12 are radially spaced apart from each other a radial distance indicated by $D_o$, for example, 0.7 mm. The parallel cords 9 of the first belt 10 extend at an angle $\theta$ (FIG. 3) of approximately 52 degrees with respect to a mid-circumferential centerline 14 of the tread portion 2. For the purposes of this invention, the mid-circumferential centerline 14 shall mean a circle which lies on the ground contacting surface of the tread midway of the tread portion 2 and is contained in a plane which is substantially perpendicular to the rotational axis of the tire 1. The parallel cords 9' of the second belt 11 and the parallel cords 9" of the third belt 12 are oriented in opposite directions with each other and extend in the opposite directions at an angle of approximately 17 degrees with respect to the mid-circumferential centerline 14 of the tread portion 2. The first belts are laterally spaced apart a lateral space $W_o$ symmetrically with respect to the mid-circumferential centerline 14. In the first embodiment, the lateral space $W_o$ is 25 mm. Each of the first belts 10 is capable of resisting in the directions of cords normal or tensile force of 1700 kg per a length of 25.4 mm (1 inch) measured in the direction substantially perpendicular to the cords 9. The end 10a of the left-hand first belt 10 and the end 10b of the right-hand first belt 10 are located laterally inwardly of the opposite ends 12a and 12b of the third belt 12 and more specifically, the opposite lateral ends 10a and 10b of the spaced-apart first belts 10 are located within less than 5 percent of the width $W_3$ of the third belt 12 from the corresponding opposite lateral ends 12a and 12b of the third belt 12, respectively. The width $W_3$ of the third belt 12 is less than the width $W_2$ of the second belt 11. An intervening rubber S having a triangle cross section is interposed between the lateral end 12a of the third belt 12 and the lateral end portion of the second belt 11. Likewise, the intervening rubber S is interposed between the lateral end 12b of the third belt 12 and the end portion of the second belt 11. Due to the existence of the intervening rubber S, a distance $D_{2*3}$ (FIG. 3) from the second belt 11 to the laterally outermost end of the third belt 12 is approximately 3 mm which is substantially four times the radial space $D_o$ between two adjacent belts of the belt portion 7, and a base length H (FIG. 3) of the intervening rubber S extending between the second and third belts 11 and 12 is 10 mm. The aforedescribed belt portion 7 is used in the radial tire 1 wherein a radial distance C (FIG. 2) between the lateral end 2a or 2b of the tread portion 2 and a tangential line T at the mid-circumferential centerline 14 is less than 12.7 percent of the tread width W between the lateral outermost ends of the tread portion 2.

Figure 4:
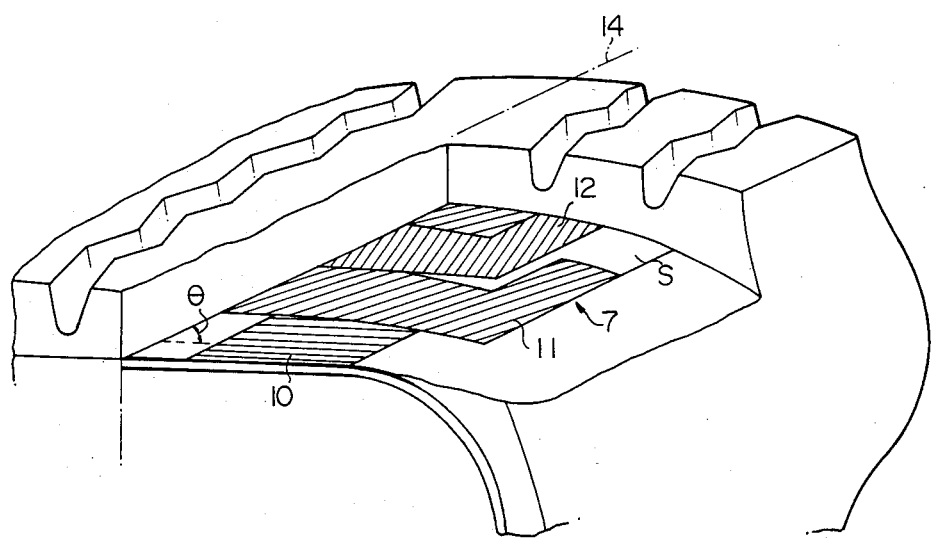
FIG. 4 is an enlarged view, generally schematic in form, showing orientations of the cords of the belts shown in FIG. 3.

The operation for the radial tire 1 constructed in accordance with the present invention will be now described in conjunction with FIGS. 2, 3 and 4.

In radial tires for trucks and buses travelling at high speed mostly on paved road and sometimes non-paved road, a large force is exerted repeatedly in the direction of the rotational axis of the tire on both the tread portion and the belt portion. The repeated large forces produce a large strain in the belts of the belt portion, particularly at the lateral ends of the belts. In addition, if the tire strikes obstacles such as rocks or stones, the tire will be undesirably deformed. In this instance, the tire is undesirably bent at both the tread portion thereof and the belt portion thereof, so that a large strain occurs between the plies of the belt portion, between the belt portion and the tread portion or between the belt portion and the carcass portion. However, in the radial tire for trucks and buses constructed in accordance with the present invention, as aforesaid, the first belts 10 are laterally spaced apart 25 mm symmetrically with respect to the mid-circumferential centerline 14, and also the opposite ends 10a and 10b of the first belts 10 are located laterally inwardly within less than 5 percent of the width $W_3$ of the third belt 12 from the corresponding opposite lateral ends 12a and 12b of the third belt 12, respectively. Further, the cords 9 of the first belts 10 are disposed at an angle of 52 degrees with respect to the mid-circumferential centerline 14 so as to be inclined more toward the mid-circumferential centerline 14 than the cords of the conventional tire disposed at an angle of 60 to 90 degrees. Accordingly, the rigidities of the first belts 10 are reduced to a relatively small against the force in the direction of the rotational axis of the tire, so that the large strain as aforesaid is not produced in the first belts 10. In addition, according to the present invention, since the cords 9' of the second belt 11 are oriented in the direction in which the cords 9 of the first belt 10 extend, the strain to be produced in the belt portion 7 is remarkably small. Moreover, since the intervening rubbers S are provided between the second belt 11 and the opposite ends 12a and 12b of the third belt 12 and has the radial height of approximately 3 mm and the base length H of 10 mm, the intervening rubbers S serve to prevent the occurrence of the large strain and the separation between the plies of the belt portion 7. Accordingly, there is no occurrence of the separation between the ends of the belts and the tread portion, and due to the relatively small rigidity of the belt portion 7 in the direction of the rotational axis of the tire, the impact force caused by the rocks or stones scattered on the off-road is partially alleviated and thus the resistance to cut is enhanced. Further, since the cords 9' of the second belt 11 and the cords 9'' of the third belt 12 are oriented in opposite directions with each other and extend in the opposite directions at an angle of approximately 17 degrees with respect to the mid-circumferential centerline 14 of the tire 1, the tire 1 has a relatively high rigidity against force in the circumferential direction of the tire. Hence, the radial tire 1 for trucks and buses, constructed as aforedescribed has a high durability and is capable of being continuously used for a long period of time without inducing failures even when the tire is used under very severe and highly loaded conditions on the non-paved road.

Figure 5:
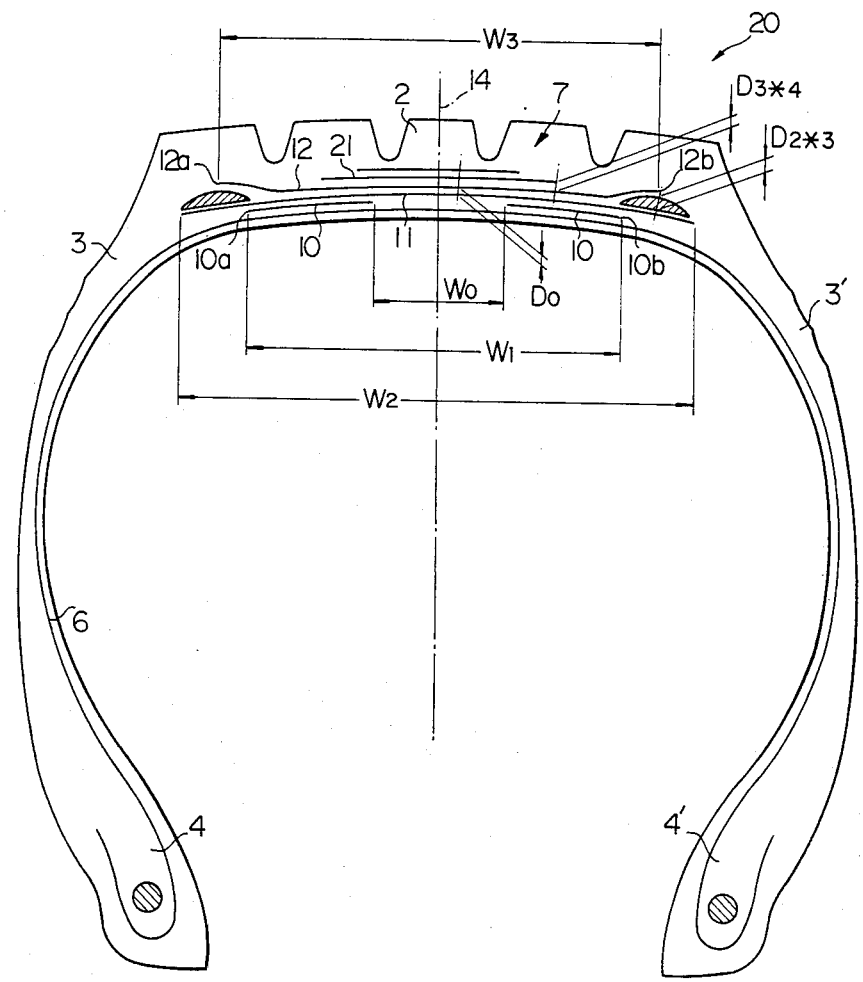
FIG. 5 is a cross sectional view of the radial tire of a second embodiment constructed in accordance with present invention in which the belt portion thereof is similar to that of the first embodiment but further comprises one more belt as a radially outermost belt.
Figure 6:
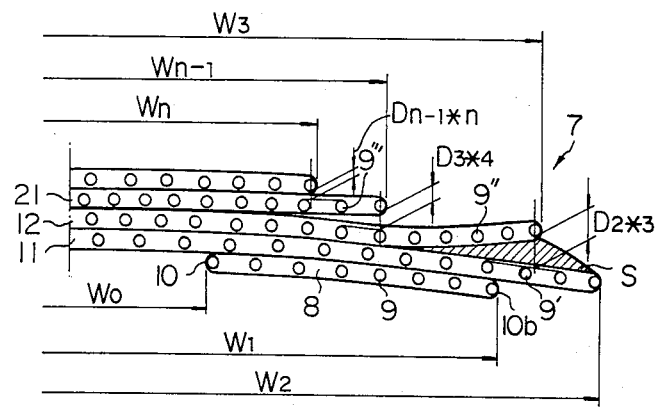
FIG. 6 is an enlarged view of the belts of the belt portion of the radial tire shown in FIG. 5.
Figure 7:
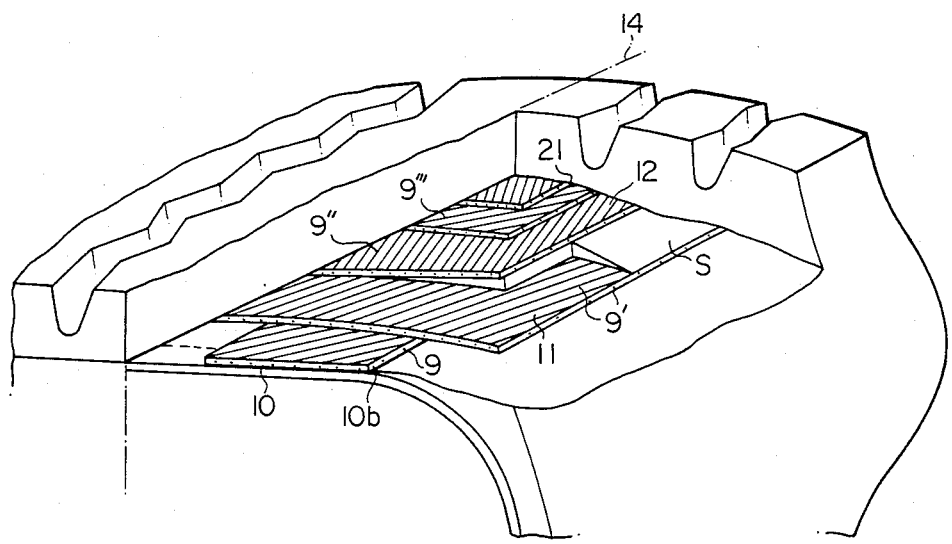
FIG. 7 is an enlarged view, generally schematic in form, showing orientations of the cords of the belts shown in FIG. 6.

With reference to FIGS. 5, 6 and 7, there is shown the second embodiment of a radial tire 20 constructed in accordance with the present invention. In the embodiment, it is noted that a belt portion between a tread portion and a carcass portion is constituted by at least four plies. It is also noted that the components and members of the second embodiment which are substantially identical in construction and operational effect to those described in the first embodiment are designated by like reference numerals for avoiding the description therefor. The four plies of the belt portion 7 are numbered a pair of first belts 10, a second belt 11, a third belt 12 and a fourth belt 21 from radially inward to outward. As shown in FIG. 7, the cords 9 and 9' of the first and second belts 10 and 11, respectively, are oriented in same directions with respect to the mid-circumferential centerline 14, while the cords 9', 9'' and 9''' of the second, third and fourth belts 11, 12 and 21, respectively, are oriented in opposite directions with one another and extend in the opposite directions at an angle of approximately 17 degrees with respect to the mid-circumferential centerline 14. The belt widths $W_2$, $W_3$ and $W_4$ of the second, third and fourth belts 11, 12 and 21, respectively, are decreased from the second belt 11 to the fourth belt 21. In this instance, a distance $D_{3*4}$ from the third belt 12 to the lateral outermost end of the fourth belt 21 is given by the following equation:

$$D_{3*4}/D_{2*3} = \beta(W_4/W_3)$$

wherein the $\beta$ is between 0.3 and 1.0 and the $D_{2*3}$ is 3 mm, preferably between 2 and 4 mm. A distance $D_{k-1*k}$ from a $(K-1)$th belt to the laterally outermost end of a kth belt is determined by the aforedescribed equation. In this instance, the K is between 4 and n.

The operation for the radial tire 20 constructed in accordance with the present invention will be now described in conjunction with FIGS. 5, 6 and 7.

In tires for trucks and buses travelling at high speed mostly on paved road and sometimes on non-paved road, as mentioned in the first embodiment, a large strain occurs between the plies of the belt portion or between the belt portion and the tread portion. The largeness of this strain would be further increased if the size of the tire become large or the loads to be acted on the radial tire become large. In such case, it is therefore the object of the second embodiment to reduce the large strain to be produced in the belt portion to a predetermined small value. In the second embodiment, the belt portion 7 of the radial tire 20 is constituted by at least four plies, and the relative position of the first to the fourth belt of the belt portion 7, the relationship of the widths between the belts, and the relationship between the distance $D_{k-1*k}$ from a (K−1)th belt to the laterally outermost end of a kth belt and the belt width W are determined as set forth above. More specifically, the distances between the cords 9', 9'' and 9''' are determined depending upon the largeness of the strain to be produced in the lateral outermost ends of the belts of the belt portion 7 in which a largest strain tends to occur when the tire is travelling on roads. Accordingly, even if the size of the tire become large or the loads to be acted on the radial tire become large, a relatively small strain would occur in the plies of belts of the belt portion 7 and between the tread portion 2 and the belt portion 7. In addition, there is no occurrence of the separation between the laterally outermost ends of the belts and the tread portion. It will be also understood from the foregoing description that the radial tire 20 for trucks or buses, constructed as aforedescribed has a high durability and is capable of being continuously used for a long period of time without inducing failures even when the tire is used under very severe and highly loaded conditions on the non-paved road.

Figure 8:
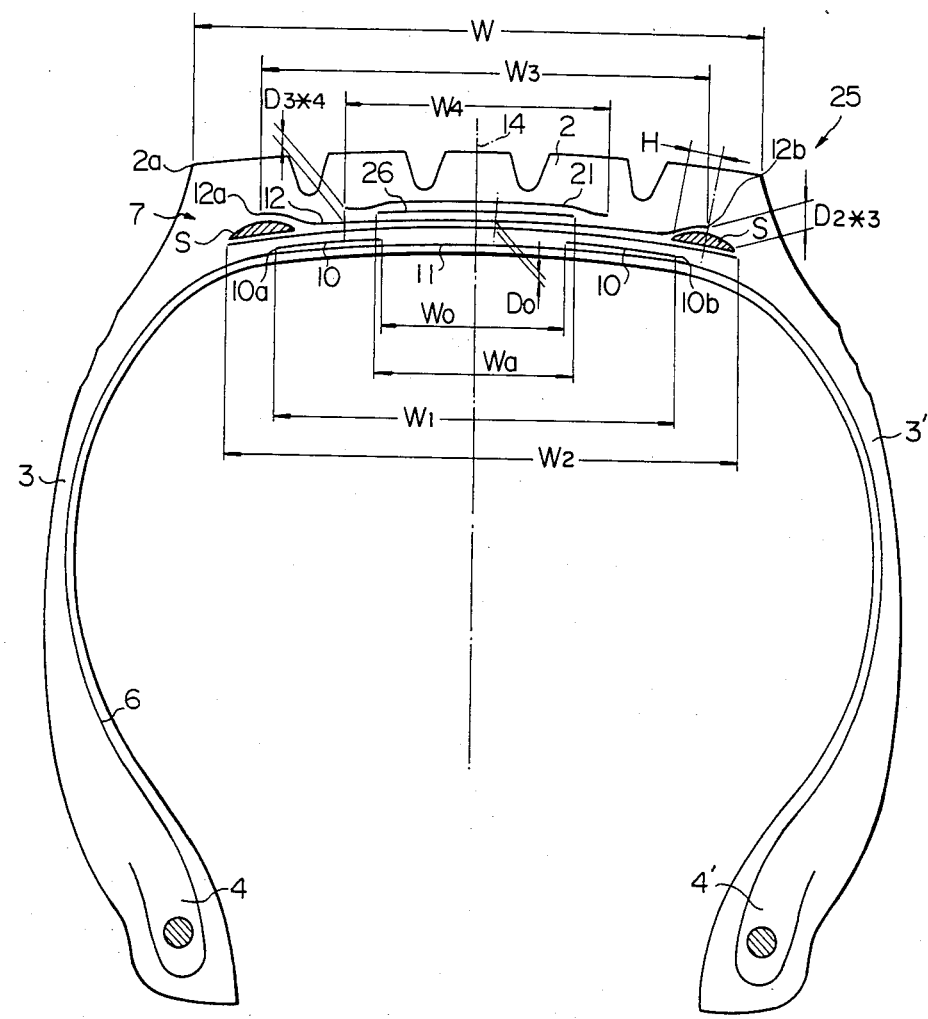
FIG. 8 is a cross sectional view of the radial tire of a third embodiment constructed in accordance with present invention in which the belt portion thereof is similar to that of the second embodiment but further comprises an auxiliary belt disposed between the third and fourth belts.
Figure 9:
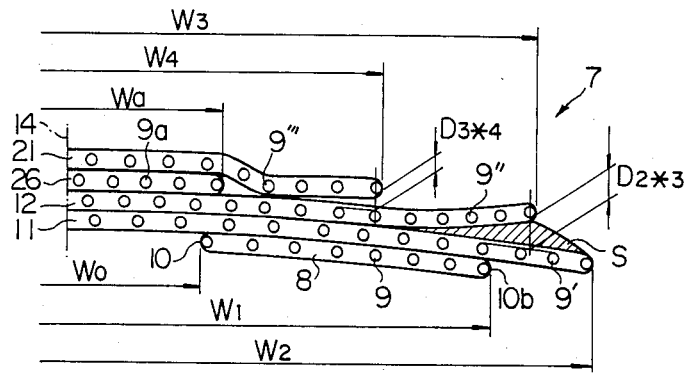
FIG. 9 is an enlarged view of the belts of the belt portion of the radial tire shown in FIG. 8.
Figure 10:
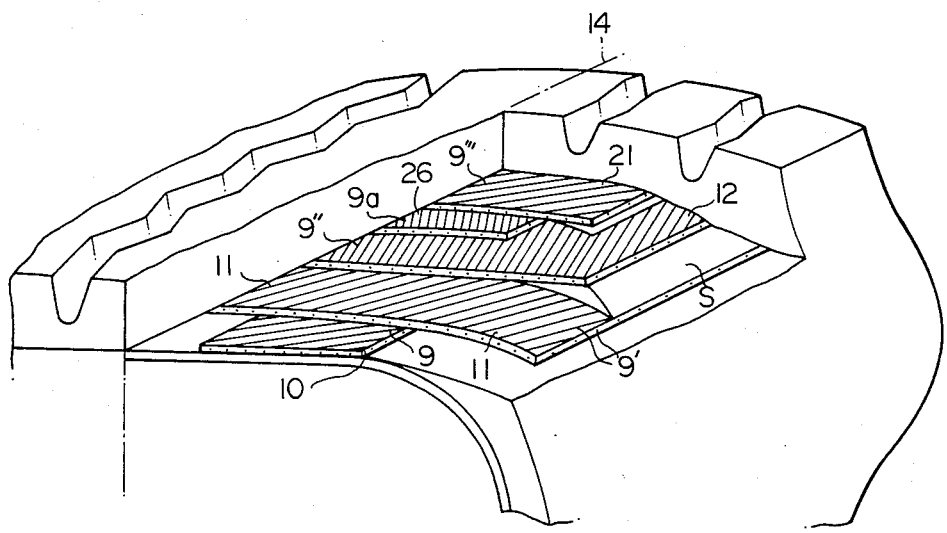
FIG. 10 is an enlarged view, generally schematic in form, showing orientations of the cords of the belts shown in FIG. 9.

With reference to FIGS. 8, 9 and 10, there is shown the third embodiment of a radial tire 25 constructed in accordance with the present invention. It is noted that the components and members of the second embodiment which are substantially identical in construction and operational effect to those described in the first embodiment are designated by like reference numerals for avoiding the description therefor. The belt portion 7 of the radial tire 25 is constituted by at least four plies. The four plies of the belt portion 7 are numbered a first belt 10, a second belt 11, a third belt 12 and a fourth belt 21 from radially inward to outward. As shown in FIG. 10, the parallel cords 9 and 9' of the first and second belts 10 and 11, respectively, are oriented in same directions with respect to the mid-circumferential centerline 14, while the cords 9', 9'' and 9''' of the second, third and fourth belts 11, 12 and 21, respectively, are oriented in opposite directions with one another and extend in the opposite directions at an angle of approximately 17 degrees with respect to the mid-circumferential centerline 14. The belt widths $W_k$ of the second, third and fourth belts 11, 12 and 21, respectively, are decreased from the second belt 11 to the fourth belts 21. In this instance, a distance $D_{3*4}$ from the third belt 12 to the lateral outermost end of the fourth belt 21 is given by the following equation:

$$D_{3*4}/D_{2*3} = \beta(W_4/W_3)$$

wherein the $\beta$ is between 0.3 and 1.0 and the $D_{2*3}$ is 3 mm, preferably from 2 to 4 mm. A distance $D_{k-1*k}$ from a (K−1)th belt to the laterally outermost end of a kth belt is determined by the aforedescribed equation. In this instance, the K is between 4 and n. In this embodiment, an auxiliary belt 26 is provided between two adjacent belts of between the second and nth belts and arranged laterally inwardly of the belt overlying the auxiliary belt 26. The auxiliary belt 26 has a width $W_a$ which ranges from 20 to 85 percent of the width of the belt overlying the auxiliary belt 26, and has embedded therein a plurality of parallel cords 9a each of which is disposed at an angle of 10 to 30 degrees with respect to the mid-circumferential centerline 14.

The operation for the radial tire 25 constructed in accordance with the present invention will be now described in conjunction with FIGS. 8, 9 and 10.

In tires for trucks and buses travelling at high speed mostly on paved road and sometimes on non-paved road, as mentioned in the first embodiment, a large strain occurs between the plies of the belt portion or between the belt portion and the tread portion. The largeness of this strain would be further increased if the size of the tire become large or the loads to be acted on the radial tire become large. In such case, in order to reduce the large strain to be produced in the belt portion 7 to a small strain of a predetermined small value, enhance resistance to impact failure and cut on the non-paved roads and at the same time maintain good cruising performance on pave-roads, the aforedescribed radial tire 25 is afforded by the present invention. The belt portion 7 of the radial tire 25 is constituted by at least four plies, and the relative position of the first to the fourth belt of the belt portion 7, the relationship of the widths between the belts, and the relationship between the distance $D_{k-1*k}$ from a (K−1)th belt to the laterally outermost end of a kth belt and the belt width W are determined as set forth above. More specifically, the distance $D_{2*3}$ between the cords 9' and 9'' and the distance $D_{3*4}$ between the cords 9'' and 9''' are determined depending upon the largeness of the strain to be produced in the lateral outermost ends of the belts of the belt portion 7 in which a largest strain tends to occur when the tire is travelling on roads. Accordingly, even if the size of the tire become large or the loads to be acted on the radial tire become large, a relatively small strain would occur in the plies of belts of the belt portion 7 and between the tread portion 2 and the belt portion 7. In addition, there is no occurrence of the separation between the laterally outermost ends of the belts and the tread portion.

In the third embodiment, between the third belt 12 and the fourth belt 21 is provided the auxiliary belt 26 having the width $W_a$ which is 70 percent of the width $W_4$ of the fourth belt 21, and the auxiliary belt 26 is disposed at an angle of approximately 17 degrees with respect to the mid-circumferential centerline 14. This particular arrangement of the auxiliary belt 26 improves the belt portion 7 in resistance to fatigue, resistance to impact force and rigidity in the circumferential direction of the tread portion. However, since the width $W_a$ of the auxiliary belt 26 is smaller than the width $W_4$ of the fourth belt 21 and also the auxiliary belt 26 is disposed laterally inwardly of the fourth belt 21, the auxiliary belt 26 does not increase the rigidity in the direction of the rotational axis of the tire. Hence, the radial tire 25 is not damaged or cut in the tread portion thereof during rotation thereof by obstacles such as rocks, stones or the like scattered on non-paved roads. According to this third embodiment, good cruising performance on paved-road is maintained due to the increased rigidity in the circumferential direction of the tire, and at the same time the resistance to cut is enhanced. Further, the strain produced in the lateral ends of the belts of the belt portion become small due to the particular construction and arrangement of the third embodiment.

While it has been described that the first belt 10 is capable of resisting in the directions of cords normal or tensile force of 1700 kg per a length of 25.4 mm (1 inch) measured in the direction substantially perpendicular to the cords 9, it is noted that a belt capable of resisting tensile force of between 970 and 2150 kg may be employed as a first belt. As will be understood from a Table 1, the durability of the belt portion abruptly drops in the case of less than 970 kg and more than 2150 kg.

The radial tires used in embodiments and references shown in the Table 1 are substantially same construction and material with each other, except for the belt structure constructed in accordance with the present invention.

TABLE 1

|  | Embodiment 3-1 | Embodiment 3-2 | Embodiment 3-3 | Reference 1 | Reference 2 |
| --- | --- | --- | --- | --- | --- |
| Tensile force of Belt (kg/inch) | 990 | 1650 | 2145 | 800 | 2520 |
| Belt Durability | 105 | 125 | 100 | 88 | 73 |

While it has been described that the cords 9 of the first belt 10 of the belt portion 7 are disposed at an angle of 52 degrees with respect to the mid-circumferential centerline 14, it is noted that the cords 9 may be disposed at angle of between 40 and 60 degrees. As will be understood from a Table 2, the durability of the belt decreases in the case of less than 40 degrees and more than 60 degrees.

TABLE 2

|  | Embodiment 3-4 | Embodiment 3-5 | Embodiment 3-6 | Reference 3 | Reference 4 |
| --- | --- | --- | --- | --- | --- |
| Cord Angle (degree) | 40 | 50 | 60 | 35 | 70 |
| Belt Durability | 120 | 139 | 118 | 100 | 95 |

While it has been described that the lateral space $W_o$ between the first belts 10 is 25 mm, it is noted that the lateral space $W_o$ may be between 23 and 51 percent of the width $W_1$ of the first belt 10. In case of less than 23 percent, the durability of the belt portion on non-paved road decreases, and in case of more than 51 percent, the durability of the belt portion on paved road decreases.

While it has been described that the opposite lateral ends 10a and 10b of the spaced-apart first belts 10 are located within less than 5 percent of the width $W_3$ of the third belt 12 from the corresponding opposite lateral ends 12a and 12b of the third belt 12, respectively, as will be understood from a Table 3, it is noted that the durability of the belt portion abruptly decreases in the case that the locations of the opposite ends of the first belts 10 is more than 5 percent, that the locations are substantially equal to the opposite ends of the third belt 12, and that the locations are beyond the opposite ends of the third belt 12. In this instance, minus sign of the Table 3 means that the locations of the opposite ends of the first belt are beyond the opposite ends of the third belt 12.

TABLE 3

|  | Embodiment 3-5 | Embodiment 3-6 | Embodiment 3-7 | Reference 5 | Reference 6 | Reference 7 |
| --- | --- | --- | --- | --- | --- | --- |
| Locations of Ends of First Belt (percent) | 5 | 2.5 | 0 | −2.5 | −5 | 7.5 |
| Belt Durability | 98 | 110 | 100 | 68 | 62 | 80 |

While it has been described that the cords 9', 9" and 9‴ of the second, third and fourth belts 11, 12 and 21 are disposed at an angle of approximately 17 degrees with respect to the mid-circumferential centerline 14, it is noted that the angle of the cords may be between 10 and 25 degrees.

Although the kinds of the cords of the belt portion have not been specified, it is noted that all of the cords of the first to third belts or cords of the first to fourth belts may be composed of metal.

In respect of durability of the belt portion, an embodiment 3-8 is compared with a conventional radial tire. The belt portion of a radial tire (tire size: 1200-20) for large-sized trucks and buses employed in the embodiment 3-8 is constituted by four plies, that is, four reinforced steel cords. The reinforced steel cords are numbered a first, second, third and fourth belt from radially inward to outward. The parallel cords of the first belt are disposed at an angle of 52 degrees with respect to the mid-circumferential centerline and capable of resisting in the directions of cords a tensile force of 1700 kg per a distance 25.4 mm measured in the direction substantially perpendicular to the cords. The opposite ends of the first belts are located at 5 mm distance away from the opposite ends of the third belt toward the mid-circumferential centerline, and the lateral space $W_o$ between the first belts is 50 mm. The cords of the second, third and fourth belts are disposed at an angle of approximately 17 degrees with respect to the mid-circumferential centerline 14. The belt widths $W_2$, $W_3$ and $W_4$ of the second, third and fourth belt are 185 mm, 165 mm and 115 mm, respectively. The radial space $D_o$ between the belts of the belt portion 7 is 0.7 mm. The distance $D_{2*3}$ from the second belt 11 to the end 12a or 12b of the third belt 12 is 3 mm and the distance $D_{3*4}$ from the third belt 12 to the end of the fourth belt 21 is 1 mm. In this instance, the $\beta$ of the aforedescribed equation is 0.5. From the embodiment 3-8 described above, it is obtained that the radial tire constructed in accordance with the embodiment 3-8 has an excellent belt durability higher by 150 percent than the conventional radial tire in which the cords of the first belt are disposed at an angle of 68 degrees with respect to the mid-circumferential centerline.

From the foregoing description for the first embodiment of the present invention, it will be seen that the first embodiment provides an improved radial tire for trucks and buses used in the paved and non-paved road which has high resistance to cut and high durability of belts on non-paved road and at the same time maintains good cruising performance and high durability of belts on paved road. According to the second embodiment, in addition to the effect of the first embodiment, there is provided an improved radial tire in which the belts of the belt portion are not separated even if the size of the tire become large or the loads to be acted on the radial tire become large. According to the third embodiment, in addition to the effects of the first and second embodiments, there is an improved, large-sized radial tire in which the belt portion thereof has high resistance to fatigue and high resistance to impact force, and the tread portion thereof has high resistance to cut even when the tire is continuously used for a long period of time under very severe and highly loaded conditions on non-paved road.

While certain representative embodiments and details have been shown for the purpose of illustrating the invention, it will be apparent to those skilled in this art that various changes and modifications may be made therein without departing from the scope of the invention.

What is claimed is:

1. A pneumatic radial tire comprising a tread portion extending circumferentially thereabout and having a mid-circumferential centerline contained in a plane which is substantially perpendicular to the rotational axis of the tire, a pair of side portions, a pair of bead portions, a carcass disposed between the tread portion and the carcass portion;

said belt portion being constituted by at least a pair of first belts, a second belt through a (n−1)th belt and a nth belt which are arranged from radially inward to outward, the n being a natural number not less than 4;

said first belt, second belt through said (n−1)th belt and said nth belt having a first series of parallel cords, a second series of parallel cords through a (n−1)th series of parallel cords and a nth series of parallel cords embedded therein, respectively;

said first belts being capable of resisting in the directions of said cords a tensile force of between 970 and 2150 kg per a length of 25.4 mm of said first belt measured in the direction substantially perpendicularly passing through said parallel cords thereof;

said second belt through (n−1)th belt and nth belt having belt widths $W_2$ through $W_{n-1}$ and $W_n$, respectively, which are reduced from said second belt to said nth belt;

a (k−1)th belt and the lateral end of a kth belt being radially spaced apart a distance $D_{k-1*k}$ defined by an equation $D_{k-1*k}/D_{k-2*k-1} = \beta(W_k/W_{k-1})$ wherein the k is a number arbitrarily selected from 4 to said n, the $W_k$ is a width of the kth belt, and the $\beta$ is between 0.3 and 1.0;

said first belts being laterally spaced apart a predetermined lateral space symmetrically with respect to the mid-circumferential centerline and said cords thereof being disposed at an angle of between 40 to 60 degrees with respect to the mid-circumferential centerline;

said spaced-apart first belts having opposite laterally outer ends which are located laterally inwardly within less than 5 percent of the belt width $W_3$ of said third belt from the corresponding opposite lateral ends of said third belt, respectively;

said first series of the cords of said first belt and said second series of the cords of said second belt being oriented in same directions with respect to said mid-circumferential centerline; and two adjacent sets of the cords of two adjacent belts of between the second and kth belts being oriented in opposite directions with each other with respect to said mid-circumferential centerline.

2. A pneumatic tire as set forth in claim 1, in which said cords of said second belt through said kth belt extend at an angle of between 10 and 25 degrees with respect to the mid-circumferential centerline of tread portion.

3. A pneumatic tire as set forth in claim 1, in which said cords of said first belt through said kth belt are composed of metal.

4. A pneumatic tire as set forth in claim 1, in which said predetermined lateral space between the spaced-apart first belts is between 23 and 51 percent of the width $W_1$ of the first belt.

5. A pneumatic radial tire comprising a tread portion extending circumferentially thereabout and having a mid-circumferential centerline contained in a plane which is substantially perpendicular to the rotational axis of the tire, a pair of side portions, a pair of bead portions, a carcass portion having at least a carcass ply, and a belt portion disposed between the tread portion and the carcass portion;

said belt portion being constituted by at least a pair of first belts, a second belt through a (n−1)th belt and a nth belt which are arranged from radially inward to outward, the n being a natural number not less than 4, and an auxiliary belt disposed between two adjacent belts of between said second and nth belts and laterally inwardly of the adjacent belt overlying the auxiliary belt;

said first belt, second belt through a (k−1)th belt and a kth belt having a first series of parallel cords, a second series of parallel cords through a (k−1)th series of parallel cords and a kth series of parallel cords embedded therein, respectively, the k being a number arbitrarily selected from 4 to said n;

said first belts being capable of resisting in the directions of said cords a tensile force of between 970 and 2150 kg per a length of 25.4 mm of said first belt measured in the direction substantially perpendicularly passing through said parallel cords thereof;

said second belt through (k−1)th belt and kth belt having belt widths $W_2$ through $W_{k-1}$ and $W_k$, respectively, which are reduced from said second belt to said kth belt;

said auxiliary belt having a width which is less than the width of the adjacent belt overlying the auxiliary belt, and having a series of parallel cords embedded therein;

said (k−1)th and said kth belt being radially spaced apart a radial distance $D_{k-1*k}$ defined by an equation $D_{k-1*k}/D_{k-2*k-1} = \beta (W_k/W_{k-1})$ wherein the $W_k$ is a width of the kth belt and the $\beta$ is between 0.3 and 1.0;

said first belts being laterally spaced apart a predetermined lateral space symmetrically with respect to the mid-circumferential centerline and said cords thereof being disposed at an angle of between 40 to 60 degrees with respect to the mid circumferential centerline;

said spaced-apart first belts having opposite laterally outer ends which are located laterally inwardly within less than 5 percent of the belt width $W_3$ of said third belt from the corresponding opposite lateral ends of said third belt, respectively;

said first series of the cords of said first belt and said second series of the cords of said second belt being oriented in same directions with respect to said mid-circumferential centerline; and two adjacent sets of the cords of two adjacent belts of between the second and kth belts being oriented in opposite directions with each other with respect to said mid-circumferential centerline.

6. A pneumatic tire as set forth in claim 5, in which said cords of said second belt through said kth belt extend at an angle of between 10 and 25 degrees with respect to the mid-circumferential centerline of the tread portion.

7. A pneumatic tire as set forth in claim 5, in which said cords of said first belt through said kth belt are composed of metal.

8. A pneumatic tire as set forth in claim 5, in which said predetermined lateral space between the spaced-apart first belts is between 23 and 51 percent of the width $W_1$ of the first belt.

* * * * *